(12) United States Patent
Hokazono

(10) Patent No.: US 8,151,998 B2
(45) Date of Patent: Apr. 10, 2012

(54) CRYSTALLINE POLYMER MICROPOROUS MEMBRANE, METHOD FOR PRODUCING THE SAME, AND FILTER FOR FILTRATION

(75) Inventor: Hirohisa Hokazono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/549,664

(22) Filed: Aug. 28, 2009

(65) Prior Publication Data

US 2010/0051535 A1 Mar. 4, 2010

(30) Foreign Application Priority Data

Sep. 2, 2008 (JP) ................................ 2008-225164

(51) Int. Cl.
*B01D 39/00* (2006.01)
*B01D 29/07* (2006.01)
*B29C 49/08* (2006.01)
*D02J 1/06* (2006.01)

(52) U.S. Cl. ............. 210/500.36; 210/493.1; 264/288.4; 264/288.8; 264/290.2

(58) Field of Classification Search ............ 210/500.27, 210/490, 500.36, 493.1; 264/532, 127, 288.8, 264/241, 41, 288.4, 210.7, 290.2; 428/212, 428/218, 310.5, 221, 224, 422, 311.51; 156/182, 156/273, 275.5; 521/134
See application file for complete search history.

(56) References Cited

U.S. PATENT DOCUMENTS

| | | | |
|---|---|---|---|
| 1,421,341 A | 6/1922 | Zsigmondy et al. | |
| 2,783,894 A | 3/1957 | Lovell et al. | |
| 4,196,070 A | 4/1980 | Chao et al. | |
| 4,598,011 A * | 7/1986 | Bowman | 428/221 |
| 4,873,037 A * | 10/1989 | Chau et al. | 264/49 |
| 4,902,423 A * | 2/1990 | Bacino | 210/500.36 |
| 4,945,125 A * | 7/1990 | Dillon et al. | 524/427 |
| 5,066,683 A * | 11/1991 | Dillon et al. | 521/54 |
| 5,157,058 A * | 10/1992 | Dillon et al. | 521/134 |
| 5,225,131 A * | 7/1993 | Tamaru et al. | 264/113 |
| 5,234,739 A * | 8/1993 | Tanaru et al. | 428/131 |
| 5,234,751 A * | 8/1993 | Harada et al. | 442/50 |
| 5,545,475 A * | 8/1996 | Korleski | 428/306.6 |

(Continued)

FOREIGN PATENT DOCUMENTS

| | | |
|---|---|---|
| DE | 3003400 A1 | 8/1980 |
| JP | 61-171505 A | 8/1986 |
| JP | 11-515036 A | 12/1999 |
| JP | 2007-332342 A | 12/2007 |
| WO | 2007-019350 A3 | 2/2007 |

OTHER PUBLICATIONS

Extended European Search Report dated, Nov. 16, 2009.
Office Action dated Nov. 29, 2011 in coresponding Japanese Patent Application No. 2008-225164.

*Primary Examiner* — Ana Fortuna
(74) *Attorney, Agent, or Firm* — Sughrue Mion, PLLC

(57) ABSTRACT

To provide a crystalline polymer microporous membrane including: a microstructure on the side of one surface of the membrane, the microstructure being composed of series of nodules interconnected with one another by fibrils, wherein the average pore diameter at the one surface of the membrane is larger than the average pore diameter at another surface of the membrane, and the average pore diameter continuously changes from the one surface toward the other surface, and wherein the nodules have an aspect ratio (length/width) of 25 or greater.

11 Claims, 12 Drawing Sheets

U.S. PATENT DOCUMENTS

| | | | |
|---|---|---|---|
| 5,552,100 A * | 9/1996 | Shannon et al. | 264/127 |
| 5,814,405 A * | 9/1998 | Branca et al. | 428/311.51 |
| 5,980,799 A * | 11/1999 | Martakos et al. | 264/127 |
| 6,110,333 A * | 8/2000 | Spethmann et al. | 204/252 |
| 6,235,371 B1 | 5/2001 | Mitsuhashi et al. | |
| 6,235,377 B1 * | 5/2001 | Dillon et al. | 428/212 |
| 6,596,112 B1 * | 7/2003 | Ditter et al. | 156/182 |
| 6,827,737 B2 * | 12/2004 | Hill et al. | 623/1.4 |
| 6,852,223 B2 * | 2/2005 | Huang et al. | 210/500.36 |
| 7,060,210 B2 * | 6/2006 | Roberts | 264/49 |

\* cited by examiner

CRYSTALLINE POLYMER MICROPOROUS MEMBRANE, METHOD FOR PRODUCING THE SAME, AND FILTER FOR FILTRATION

BACKGROUND OF THE INVENTION

1. Field of the Invention

The present invention relates to a crystalline polymer microporous membrane having a high filtration efficiency, used for microfiltration of gases, liquids, etc.; a method for producing the crystalline polymer microporous membrane; and a filter for filtration.

2. Description of the Related Art

Microporous membranes have long since been known and are widely used for filters for filtration, and the like (refer, for example, to "Synthetic Polymer Membrane" authored by R. Kesting, published by The McGraw-Hill Companies, Inc.). Examples of such microporous membranes include those produced using cellulose esters as raw materials (refer, for example, to U.S. Pat. No. 1,421,341), those produced using aliphatic polyamides as raw materials (refer, for example, to U.S. Pat. No. 2,783,894), those produced using polyfluorocarbons as raw materials (refer, for example, to U.S. Pat. No. 4,196,070), and those produced using polypropylene as a raw material (refer, for example, to West Germany Patent No. 3,003,400).

These microporous membranes are used for filtration and sterilization of cleaning water for use in the electronics industry, water for medical uses, water for pharmaceutical production processes and water for foods and drinks. In recent years, the microporous membranes have been coming to be used for wider purposes and in larger amounts, and note has been taken of microporous membranes which are highly reliable in terms of trapping particles. Among these, microporous membranes made of crystalline polymers are superior in chemical resistance, and microporous membranes produced using polytetrafluoroethylene (PTFE) as a raw material, in particular, are superior in both heat resistance and chemical resistance and thus are attracting more and more demands.

Meanwhile, Japanese Patent Application Laid-Open (JP-A) No. 11-515036 proposes a method for producing a porous polytetrafluoroethylene product, including a step of uniaxially stretching a tape at a temperature below the crystalline melting point of a polytetrafluoroethylene component and increasing the temperature of the tape to a temperature above the crystalline melting point of the polytetrafluoroethylene component so as to fix the stretched tape in an amorphous form, and a step of stretching the tape in a direction perpendicular to the direction of the above-mentioned stretching at a temperature above the crystalline melting point of the polytetrafluoroethylene component. According to this proposal, it is possible to increase the flow rate in filtration. However, this proposal presents such a problem that the filtration capability per unit area of a microporous membrane is low (in other words, the filtration life is short).

Meanwhile, JP-A No. 2007-332342 proposes a method for producing a crystalline polymer microporous membrane, including a semi-baking step in which thermal energy is provided to a surface of an unbaked film such that the film has a temperature gradient with respect to its thickness direction. According to this proposal, multistage filtration is enabled by pores with an asymmetrical structure, thereby making it possible to lengthen the filtration life of the microporous membrane. However, this proposal presents such a problem that a microporous membrane with a high flow rate cannot be produced. Moreover, the method for producing a crystalline polymer microporous membrane by means of the semi-baking step does not enable the membrane to have a temperature gradient unless the membrane is thick to some extent, and it is difficult to reduce its thickness in reality.

BRIEF SUMMARY OF THE INVENTION

An object of the present invention is to provide a crystalline polymer microporous membrane which is capable of efficiently trapping fine particles, prevents clogging, yields a high flow rate and has a long filtration life; a method for producing a crystalline polymer microporous membrane, capable of efficiently producing the above-mentioned crystalline polymer microporous membrane; and a filter for filtration, which uses the above-mentioned crystalline polymer microporous membrane.

Means for solving the problems are as follows.

<1> A crystalline polymer microporous membrane including: a microstructure on the side of one surface of the membrane, the microstructure being composed of series of nodules interconnected with one another by fibrils, wherein the average pore diameter at the one surface of the membrane is larger than the average pore diameter at another surface of the membrane, and the average pore diameter continuously changes from the one surface toward the other surface, and wherein the nodules have an aspect ratio (length/width) of 25 or greater.

<2> The crystalline polymer microporous membrane according to <1>, wherein the microstructure occupies 90% or less of the membrane relative to the total thickness of the membrane, spreading from the one surface in a thickness direction.

<3> The crystalline polymer microporous membrane according to one of <1> and <2>, having a thickness of 50 μm or less.

<4> The crystalline polymer microporous membrane according to any one of <1> to <3>, being made of polytetrafluoroethylene.

<5> A method for producing a crystalline polymer microporous membrane, including: performing asymmetrical heating in which one surface of a film made of a crystalline polymer is heated so as to form a semi-baked film having a temperature gradient with respect to a thickness direction of the film, primarily stretching the semi-baked film in a uniaxial direction, sintering the primarily stretched film by heating the film at an equal or higher temperature than in the asymmetrical heating, and secondarily stretching the sintered film in a direction perpendicular to the uniaxial direction.

<6> The method according to <5>, wherein the film is heated at 350° C. or higher in the sintering.

<7> The method according to one of <5> and <6>, wherein in the asymmetrical heating, the crystalline polymer film is heated by being irradiated with an electromagnetic wave.

<8> The method according to <7>, wherein the electromagnetic wave is an infrared ray.

<9> The method according to any one of <5> to <8>, wherein the crystalline polymer is polytetrafluoroethylene.

<10> A filter for filtration, including the crystalline polymer microporous membrane according to any one of <1> to <4>.

A crystalline polymer microporous membrane of the present invention is a membrane including: a microstructure on the side of one surface of the membrane, the microstructure being composed of series of nodules interconnected with one another by fibrils, wherein the average pore diameter at the one surface of the membrane is larger than the average pore diameter at another surface of the membrane, and the average pore diameter continuously changes from the one surface toward the other surface, and wherein the nodules have an aspect ratio (length/width) of 25 or greater.

The crystalline polymer microporous membrane of the present invention is capable of efficiently trapping fine particles for a long period of time, yields a high flow rate, prevents clogging and has a long filtration life; therefore, the membrane is suitable for industrial filtration of large amounts of liquid, for example.

A method of the present invention for producing a crystalline polymer microporous membrane is a method including: performing asymmetrical heating in which one surface of a film made of a crystalline polymer is heated so as to form a semi-baked film having a temperature gradient with respect to a thickness direction of the film, primarily stretching the semi-baked film in a uniaxial direction, sintering the primarily stretched film by heating the film at an equal or higher temperature than in the asymmetrical heating, and secondarily stretching the sintered film in a direction perpendicular to the uniaxial direction.

The method of the present invention for producing a crystalline polymer microporous membrane is capable of efficiently producing the above-mentioned crystalline polymer microporous membrane of the present invention.

A filter of the present invention for filtration uses the crystalline polymer microporous membrane of the present invention; therefore, the filter is capable of efficiently trapping fine particles by performing filtration as the surface with a larger average pore diameter is positioned on the inlet side. Also, since the filter has a large specific surface area, the filter yields a great effect with which fine particles are removed by adsorption or adhesion before they reach a portion with the smallest pore diameter, thereby enabling its filtration life to lengthen greatly.

According to the present invention, it is possible to solve the problems in related art and provide a crystalline polymer microporous membrane which is capable of efficiently trapping fine particles, prevents clogging, yields a high flow rate and has a long filtration life; a method for producing a crystalline polymer microporous membrane, capable of efficiently producing the above-mentioned crystalline polymer microporous membrane; and a filter for filtration, which uses the above-mentioned crystalline polymer microporous membrane.

Figure 1A:
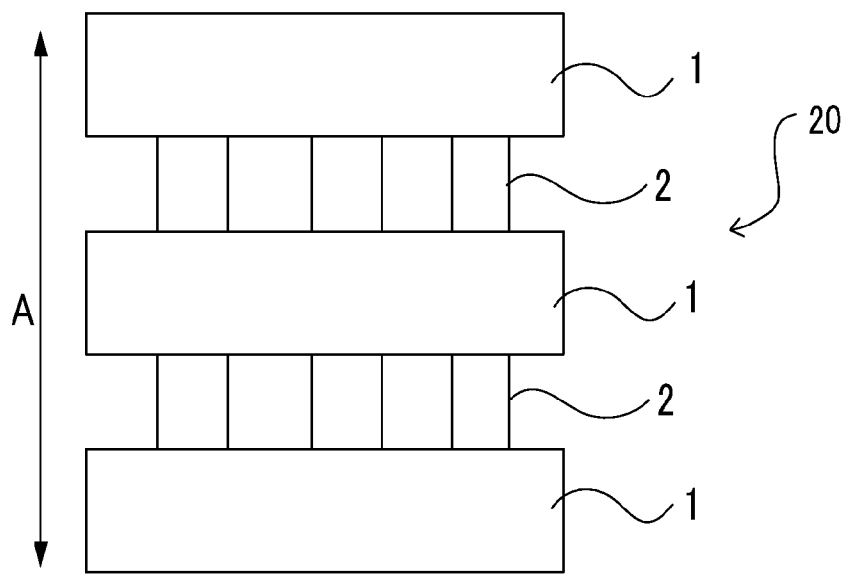
FIG. 1A is a drawing showing a primary stretching step.

DETAILED DESCRIPTION OF THE INVENTION (Crystalline Polymer Microporous Membrane)

A crystalline polymer microporous membrane of the present invention is a membrane including a microstructure on the side of one surface of the membrane, the microstructure being composed of series of nodules interconnected with one another by fibrils, wherein the average pore diameter at the one surface of the membrane is larger than the average pore diameter at another surface of the membrane, and the average pore diameter continuously changes from the one surface toward the other surface, and wherein the nodules have an aspect ratio (length/width) of 25 or greater.

<First Characteristic of Microporous Membrane>

A first characteristic of the crystalline polymer microporous membrane of the present invention is that the average pore diameter at one surface of the membrane is larger than the average pore diameter at another surface of the membrane, and the average pore diameter continuously changes from the one surface toward the other surface.

The crystalline polymer microporous membrane has a larger average pore diameter at its one surface than at its other surface. Specifically, when the membrane is assumed to have a thickness of 10, the average pore diameter at a portion located at a depth of 1 from the front surface of the membrane is denoted by P1, and the average pore diameter at a portion located at a depth of 9 from the front surface of the membrane is denoted by P2, P1/P2 is preferably in the range of 2 to 10,000, more preferably in the range of 3 to 100.

Also, regarding the crystalline polymer microporous membrane, the ratio of the average pore diameter at its one surface to the average pore diameter at its other surface (the average pore diameter at its one surface/the average pore diameter at its other surface) is preferably in the range of 5 to 30, more preferably in the range of 10 to 25, even more preferably in the range of 15 to 20.

Here, the average pore diameter is, for example, measured as follows: the front surface of the membrane is photographed (SEM photograph with a magnification of 1,000 to 5,000) using a scanning electron microscope (HITACHI S-4000, and HITACHI E1030 (for vapor deposition), both manufactured by Hitachi, Ltd.), the photograph is taken into an image processing apparatus (Name of main body: TV IMAGE PROCESSOR TVIP-4100II, manufactured by Nippon Avionics Co., Ltd., Name of control software: TV IMAGE PROCESSOR IMAGE COMMAND 4198, manufactured by Ratoc System Engineering Co., Ltd.) so as to obtain an image only including crystalline polymer fibers, and the average pore diameter is calculated by arithmetically processing the image.

The crystalline polymer microporous membrane of the present invention includes both an aspect (first aspect) in which the average pore diameter continuously changes from its one surface toward its other surface, and an aspect (second aspect) in which the membrane has a single-layer structure. Addition of these aspects makes it possible to lengthen the filtration life effectively.

The expression "the average pore diameter continuously changes from its one surface toward its other surface" used in the first aspect means that when the distance (d) from the one surface with respect to the thickness direction (which is equivalent to the depth from the one surface) is plotted on the horizontal axis on a graph, and the average pore diameter (D) is plotted on the vertical axis on the graph, the graph is represented by one continuous line. The graph concerning the area between the one surface (d=0) and the other surface (d=membrane thickness) may be composed only of regions where the inclination is negative (dD/dt<0), or may be composed of regions where the inclination is negative and regions where the inclination is zero (dD/dt=0), or may be composed of regions where the inclination is negative and regions where the inclination is positive (dD/dt>0). It is desirable that the graph be composed only of regions where the inclination is negative (dD/dt<0), or composed of regions where the inclination is negative and regions where the inclination is zero (dD/dt=0). It is particularly desirable that the graph be composed only of regions where the inclination is negative (dD/dt<0).

The one surface of the membrane is preferably among the regions where the inclination is negative. In the regions where the inclination is negative (dD/dt<0), the inclination may be constant or vary. For instance, when the graph concerning the crystalline polymer microporous membrane of the present invention is composed only of regions where the inclination is negative (dD/dt<0), it is possible to employ an aspect in which dD/dt at the other surface of the membrane is greater than dD/dt at the one surface of the membrane. Also, it is possible to employ an aspect in which dD/dt gradually increases from the one surface of the membrane toward the other surface of the membrane (an aspect in which the absolute value thereof decreases).

The term "single-layer structure" used in the second aspect excludes multilayer structures which are each formed, for example, by sticking together or depositing two or more layers. In other words, the term "single-layer structure" used in the second aspect means a structure not including a border between layers that exists in a multilayer structure. In the second aspect, a plane where the average pore diameter is smaller than that at an unheated surface and larger than that at a heated surface preferably exists in the membrane.

The crystalline polymer microporous membrane of the present invention preferably includes both the characteristics of the first and second aspects. Specifically, the microporous membrane is preferably such that the average pore diameter at one surface of the membrane is larger than the average pore diameter at the other surface of the membrane, the average pore diameter continuously changes from the one surface toward the other surface, and the membrane has a single-layer structure. Such a microporous membrane makes it possible to trap fine particles highly efficiently when a solution or the like is passed for filtration from the side of the surface with a larger average pore diameter, enables its filtration life to lengthen greatly and can be produced easily and at a low cost.

<Second Characteristic of Microporous Membrane>

A second characteristic of the crystalline polymer microporous membrane of the present invention is that the membrane includes a microstructure on the side of the one surface of the membrane, the microstructure being composed of series of nodules interconnected with one another by fibrils, and the nodules have an aspect ratio (length/width) of 25 or greater.

The nodules means masses of primary particles to which fibrils are connected, in which the masses are larger in diameter than the fibrils and each mass is 0.1 m or larger in diameter.

The fibrils means fibers which appear between each two fused particles when mechanical force is applied to the particles.

The aspect ratio of the nodules means the average value of length/width of the nodules. The aspect ratio (length/width) is 25 or greater, preferably 50 or greater. When the aspect ratio (length/width) is less than 25, the nodules that are greatly related to the membrane thickness cannot be sufficiently stretched, so that the membrane becomes thick, and the flow rate possibly decreases. Here, in FIG. 2B, the letter C denotes the length of a nodule, and the letter D denotes the width of the nodule. The length and width of each nodule can be measured, for example, by photographing a surface (using a scanning electron microscope (SEM), an optical microscope, a laser microscope, etc.).

The area ratio of the fibrils to the nodules (fibrils/nodules) is preferably in the range of 99:1 to 75:25, more preferably in the range of 99:1 to 85:15. When the area ratio (fibrils/nodules) is less than 75:25, the area of the nodules is so large that the flow rate may be insufficient. When the area ratio (fibrils/nodules) is greater than 99:1, the number of pores is too large and thus the pores may be too small in diameter.

The area ratio (fibrils/nodules) can be measured in accordance with the following method. A porous membrane surface is photographed (SEM photograph with a magnification of 1,000 to 5,000) using a scanning electron microscope (HITACHI S-4000 or HITACHI E1030, manufactured by Hitachi, Ltd.). This photograph is taken into an image processing apparatus (Name of main body: TV IMAGE PROCESSOR TVIP-410011, manufactured by Nippon Avionics Co., Ltd., Name of control software: TV IMAGE PROCESSOR IMAGE COMMAND 4198, manufactured by Ratoc System Engineering Co., Ltd.) so as to separate the fibrils and the nodules from each other and thus obtain an image only including the fibrils and an image only including the nodules. Then the maximum nodule area is calculated by arithmetically processing the image only including the nodules, and the average diameter of the fibrils is calculated by arithmetically processing the image only including the fibrils (calculated by dividing the total area by ½ of the total circumferential length). The area ratio of the fibrils to the nodules can be calculated from the ratio of the aggregate area of the fibril image to the aggregate area of the nodule image.

The microstructure preferably occupies 90% or less, more preferably 80% or less, of the membrane relative to the total thickness of the membrane, spreading from the one surface in a thickness direction. When the microstructure occupies more than 90% of the membrane relative to the total thickness of the membrane, spreading from the one surface in the thickness direction, a dense layer becomes so thin that there may be a decrease in trapping ability.

The membrane thickness of the crystalline polymer microporous membrane is preferably 50 µm or less, more preferably 45 µm or less. When the membrane thickness is greater than 50 µm, the flow rate may be insufficient. The membrane thickness can be measured, for example, using a 0.001 mm dial thickness gauge (SM1201, manufactured by TECLOCK Corporation). The membrane thickness is measured at arbitrarily selected five places of the membrane, and the average value thereof is defined as the membrane thickness.

—Crystalline Polymer—

In the present invention, the term "crystalline polymer" means a polymer having, in a mixed manner in its molecular structure, crystalline regions where long chain molecules are regularly arranged and noncrystalline regions where long chain molecules are irregularly arranged. Such a polymer exhibits crystallinity by undergoing physical treatment. For instance, in the case where a polyethylene film is stretched by external force, there is a phenomenon confirmed in which the film that is transparent at the beginning turns white in a turbid manner. This is because the molecules in the polymer are aligned in one direction by the external force and thus crystallinity is exhibited.

The crystalline polymer is not particularly limited and may be suitably selected according to the purpose. Examples thereof include polyalkylenes, polyesters, polyamides, polyethers and liquid-crystalline polymers. Specific examples thereof include polyethylenes, polypropylenes, nylons, polyacetals, polybutylene terephthalate, polyethylene terephthalate, syndiotactic polystyrenes, polyphenylene sulfides, polyether ether ketones, wholly aromatic polyamides, wholly aromatic polyesters, fluorine resins and polyether nitrites.

Among these, in terms of chemical resistance and handleability, polyalkylenes (for example, polyethylenes and polypropylenes) are preferable, particularly fluorine polyalkylenes produced by partially or wholly replacing hydrogen atoms of alkylene groups in the polyalkylenes with fluorine atoms, more particularly polytetrafluoroethylene (PTFE).

The polyethylenes vary in density depending upon their branching degrees and are classified into low-density polyethylenes (LDPE) that have high branching degrees and are low in crystallinity and high-density polyethylenes (HDPE) that have low branching degrees and are high in crystallinity, and both LDPE and HDPE can be used. Among these, HDPE is particularly preferable in terms of controlling the crystallinity.

As the polytetrafluoroethylene, in general, polytetrafluoroethylene produced by emulsion polymerization can be used. Use of polytetrafluoroethylene in fine powder form, produced by coagulating an aqueous dispersion obtained by emulsion polymerization, is preferable.

The polytetrafluoroethylene is not particularly limited and may be suitably selected according to the purpose, and a commercially available product may be used for the polytetrafluoroethylene. Examples of the commercially available product include POLYFLON PTFE F-104, POLYFLON PTFE F-201, POLYFLON PTFE F-205, POLYFLON PTFE F-207 and POLYFLON PTFE F-301 (which are produced by DAIKIN INDUSTRIES, LTD); Fluon PTFE CD1, Fluon PTFE CD141, Fluon PTFE CD145, Fluon PTFE CD123, Fluon PTFE CD076 and Fluon PTFE CD090 (which are produced by ASAHI GLASS CO., LTD.); and Teflon (registered trademark) PTFE 6-J, Teflon (registered trademark) PTFE 62XT, Teflon (registered trademark) PTFE 6C-J and Teflon (registered trademark) PTFE 640-J (which are produced by DU PONT-MITSUI FLUOROCHEMICALS COMPANY, LTD.).

Among these, F-104, CD1, CD141, CD145, CD123 and 6-J are preferable, particularly F-104, CD1, CD123 and 6-J, more particularly CD123.

The crystalline polymer preferably has a glass transition temperature or a melting point of 40° C. to 400° C., more preferably 50° C. to 350° C.

The crystalline polymer preferably has a mass average molecular weight of 1,000 to 100,000,000.

The crystalline polymer preferably has a number average molecular weight of 500 to 50,000,000, more preferably 1,000 to 10,000,000.

(Method for Producing Crystalline Polymer Microporous Membrane)

A method for producing a crystalline polymer microporous membrane includes an asymmetrical heating step, a primary stretching step, a sintering step and a secondary stretching step, and also includes a crystalline polymer film producing step and, if necessary, other step(s).

—Crystalline Polymer Film Producing Step—

The crystalline polymer film producing step includes producing a mixture of a crystalline polymer and an extrusion aid, subjecting the mixture to paste extrusion and extending the mixture under pressure.

The crystalline polymer may be suitably selected from the above-mentioned substances according to the purpose.

The extrusion aid is preferably a liquid lubricant, and specific examples thereof include solvent naphtha and white oil. A commercially available product may be used as the extrusion aid, for example a hydrocarbon oil such as ISOPAR produced by Esso Sekiyu K. K. The amount of the extrusion aid added is preferably in the range of 20 parts by mass to 30 parts by mass per 100 parts by mass of the crystalline polymer.

In general, the paste extrusion is preferably carried out at a temperature of 50° C. to 80° C. The shape into which the mixture is extruded is not particularly limited and may be suitably selected according to the purpose; generally though, the mixture is preferably extruded into a rod. The extruded matter is subsequently extended under pressure into a film. The extension under pressure may, for example, be performed by calendering at a rate of 50 m/min, using a calender roll. The temperature at which the extension under pressure is performed is generally set at 50° C. to 70° C.

Thereafter, the film is preferably dried by heating so as to remove the extrusion aid and thus to form a crystalline polymer unheated film. The heating temperature at this time is not particularly limited and may be suitably selected according to the type of the crystalline polymer used, with the range of 40° C. to 400° C. being desirable and the range of 60° C. to 350° C. being more desirable. When polytetrafluoroethylene is used as the crystalline polymer, for example, the heating temperature is desirably 150° C. to 280° C., more desirably 200° C. to 255° C.

The heating may be performed, for example, by placing the film in a hot-air drying oven. The thickness of the crystalline polymer unheated film thus produced may be suitably adjusted according to the thickness of the crystalline polymer microporous membrane to be produced as a final product, and it is necessary to adjust the thickness in view of a reduction in thickness caused by stretching in a subsequent step.

In producing the crystalline polymer unheated film, the articles described in "Polyflon Handbook" (published by DAIKIN INDUSTRIES, LTD, Revised Edition of the year 1983) may be suitably employed.

—Asymmetrical Heating Step—

The asymmetrical heating step is a step of heating one surface of a film made of a crystalline polymer so as to form a semi-baked film having a temperature gradient with respect to a thickness direction of the film.

Here, the term "semi-baked" means that the crystalline polymer is heated at a temperature which is equal to or higher than the melting point of the heated crystalline polymer and which is equal to or lower than the sum of the melting point of the unheated crystalline polymer and 15° C.

In the present invention, the term "unheated crystalline polymer" means a crystalline polymer which has not been asymmetrically heated. Meanwhile, the term "heated crystalline polymer" means a crystalline polymer which has been heated at a temperature equal to or higher than the melting point of the unheated crystalline polymer.

The melting point of the crystalline polymer means the temperature of the peak of an endothermic curve which forms when measuring the calorific value of the unheated crystalline polymer using a differential scanning calorimeter. Although the melting points of the heated crystalline polymer and the unheated crystalline polymer vary depending upon the type, average molecular weight, etc. of the crystalline polymer, the melting points are preferably in the range of 50° C. to 450° C., more preferably in the range of 80° C. to 400° C.

The selection of such a temperature range is based upon the following. In the case of polytetrafluoroethylene, for example, the melting point of heated polytetrafluoroethylene is approximately 324° C. and the melting point of unheated polytetrafluoroethylene is approximately 345° C. Accordingly, to produce a semi-baked film in the case of a polytetrafluoroethylene film, the film is preferably heated at a temperature of 327° C. to 360° C., more preferably 335° C. to 350° C., for example at 345° C. The semi-baked film is a combination of a film having a melting point of approximately 324° C. and a film having a melting point of approximately 345° C.

The semi-baked film is produced by heating one surface of the film made of a crystalline polymer. This makes it possible to control the heating temperature in an asymmetrical manner in the thickness direction and to produce a crystalline polymer microporous membrane of the present invention easily.

As for the temperature gradient with respect to the thickness direction of the film, the temperature difference between the front surface and the back surface of the film is preferably 30° C. or greater, more preferably 50° C. or greater.

The method of heating the film is not particularly limited and may be suitably selected according to the purpose. Examples of the method include (1) a method of blowing hot air to the crystalline polymer film, (2) a method of bringing the crystalline polymer film into contact with a heat medium, (3) a method of bringing the crystalline polymer film into contact with a heating member, and (4) a method of irradiating the crystalline polymer film with an electromagnetic wave.

The method of (1) is not particularly limited as long as it is a method using an apparatus capable of heating gas, and may be suitably selected according to the purpose. Examples of the apparatus include a heat gun and a duct heater, with preference being given to a duct heater. The temperature of the hot air is preferably 350° C. or higher, particularly 360° C.

As for the method of (2), examples of the heat medium include heated vapor, a molten salt and a molten metal, with preference being given to heated vapor. The temperature of the heat medium is preferably 350° C. or higher, particularly 360° C.

As for the method of (3), examples of the heating member include a heating plate and a heating roll, with preference being given to a heating roll. Use of the heating roll makes it possible to continuously perform asymmetrical heating in an assembly-line operation in an industrial manner and makes it easier to control the temperature and maintain the apparatus. The temperature of the heating roll may be adjusted to the temperature at which the film is semi-baked. The period of time for which the film is left in contact with the heating roll should be a period of time required for the desired asymmetrical heating to proceed sufficiently, and it is preferably 5 seconds to 120 seconds, more preferably 10 seconds to 90 seconds, even more preferably 15 seconds to 80 seconds.

As for the method of (4), examples of the electromagnetic wave include an X-ray, a gamma ray, an electron beam, a microwave and an infrared ray, with preference being given to an infrared ray in terms of its suitability for heating a surface layer.

For the general definition of the infrared ray, "Infrared Ray in Practical Use" (published by Ningentorekishisha in 1992) may be referred to. In the present invention, the infrared ray means an electromagnetic wave having a wavelength of 0.74 μm to 1,000 μm, and an electromagnetic wave having a wavelength of 0.74 μm to 3 μm is defined as a near-infrared ray while an electromagnetic wave having a wavelength of 3 μm to 1,000 μm is defined as a far-infrared ray.

In the present invention, since the temperature difference between the front surface and the back surface of the unheated film is preferably large, it is desirable to use a far-infrared ray that is advantageous in heating the front surface.

As for a device to apply the infrared ray, the device is not particularly limited as long as it can apply an infrared ray having a desired wavelength, and may be suitably selected according to the purpose; generally though, an electric bulb (halogen lamp) is used as a device to apply the near-infrared ray, while an heating element such as a metal oxidized surface, quartz or ceramic is used as a device to apply the far-infrared ray.

Also, infrared irradiation enables the film to be continuously semi-baked in an assembly-line operation in an industrial manner and makes it easier to control the temperature and maintain the device. Moreover, since the infrared irradiation is performed in a noncontact manner, it is superior in cleanness and does not allow defects such as pilling to arise.

The temperature of the film surface when irradiated with the infrared ray can be controlled by the output of the infrared irradiation device, the distance between the infrared irradiation device and the film surface, the irradiation time (conveyance speed) and/or the atmospheric temperature and may be adjusted to the temperature at which the film is semi-baked. The temperature is preferably 327° C. to 380° C., more preferably 335° C. to 360° C. When the temperature is lower than 327° C., the crystallized state may not change and thus the pore diameter may not be able to be controlled. When the temperature is higher than 380° C., the whole film may melt, thus possibly causing extreme deformation or thermal decomposition of the polymer.

The period of time for which the infrared irradiation lasts is not particularly limited but should be a period of time required for the desired semi-baking to proceed sufficiently, and it is preferably 5 seconds to 120 seconds, more preferably 10 seconds to 90 seconds, even more preferably 15 seconds to 80 seconds.

The infrared irradiation in the asymmetrical heating step may be carried out continuously or intermittently.

In the case where one surface of the film is continuously heated by infrared irradiation, it is preferable to perform heating of the one surface and cooling of the other surface of the film simultaneously in order to maintain the temperature gradient of the film between the one surface and the other surface.

The method of cooling the other surface is not particularly limited and may be suitably selected according to the purpose. Examples thereof include a method of blowing cold air, a method of bringing the other surface into contact with a cooling medium, a method of bringing the other surface into contact with a cooled material and a method of cooling the other surface by cooling in air. It is not preferable to bring cooled matter into contact with the heated surface of the film because the surface of the cooled matter is heated by the far-infrared ray.

Meanwhile, in the case where the asymmetrical heating step is carried out intermittently, it is preferable to heat or cool the other surface of the film intermittently so as to restrain increase in the temperature of the one surface.

—Sintering Step—

The sintering step is a step of sintering a primarily stretched film by heating the film at an equal or higher temperature than in the asymmetrical heating step.

In the sintering step, the film is preferably heated at 350° C. or higher, preferably 350° C. to 390° C. When the temperature of the heating in the sintering step is higher than 390° C., it is possible that fibrils may be cut or fused.

The method of sintering the film is not particularly limited and may be suitably selected according to the purpose. Examples thereof include (1) a method of blowing hot air to the crystalline polymer film, (2) a method of bringing the crystalline polymer film into contact with a heat medium, (3) a method of bringing the crystalline polymer film into contact with a heating member, and (4) a method of irradiating the crystalline polymer film with an electromagnetic wave.

Among these, preference is given to the methods of (3) and (4).

—Primary Stretching Step and Secondary Stretching Step—

The primary stretching step is a step of stretching the semi-baked film in a uniaxial direction, and the secondary stretching step is a step of stretching the sintered film in a direction perpendicular to the uniaxial direction.

The stretching is carried out with respect to lengthwise directions or width directions. In the primary stretching step, the film is preferably stretched in the lengthwise directions represented by the arrow A in FIGS. 1A and 2A, whereas in the secondary stretching step, the film is preferably stretched in the width directions represented by the arrow B in FIGS. 1B and 2B.

The stretch ratio of the film with respect to the lengthwise directions is preferably 4 to 100, more preferably 8 to 90, even more preferably 10 to 80. The stretch temperature with respect to the lengthwise directions is preferably 100° C. to 300° C., more preferably 200° C. to 290° C., most preferably 250° C. to 280° C.

The stretch ratio of the film with respect to the width directions is preferably 3 to 100, more preferably 5 to 90, even more preferably 10 to 70, most preferably 20 to 40. The stretch temperature with respect to the width directions is preferably 100° C. to 400° C., more preferably 200° C. to 390° C., most preferably 250° C. to 380° C.

The area stretch ratio is preferably 50 to 250, more preferably 75 to 200, even more preferably 100 to 150. On the occasion of stretching, the crystalline polymer film may be previously heated to a temperature which is equal to or lower than the stretch temperature.

Additionally, heat fixation may, if necessary, be carried out after the stretching. In general, the heat fixation is preferably carried out at a temperature equal to or higher than the stretch temperature but lower than the melting point of the crystalline polymer.

The crystalline polymer microporous membrane of the present invention has a variety of uses and can be particularly suitably used for the filter for filtration below.

(Filter for Filtration)

A filter of the present invention for filtration is characterized by using the crystalline polymer microporous membrane of the present invention.

When the crystalline polymer microporous membrane of the present invention is used for a filter for filtration, filtration is carried out with its front surface (surface with a larger average pore diameter) being positioned on the inlet side. In other words, the front surface where the pore size is larger is used as the filtration surface of the filter. By carrying out filtration as the surface with a larger average pore diameter (front surface) is positioned on the inlet side, it is possible to trap fine particles efficiently.

Also, since the crystalline polymer microporous membrane of the present invention has a large specific surface area, fine particles introduced from its front surface can be removed by adsorption or adhesion before reaching a portion with the smallest pore diameter. Therefore, the filter hardly allows clogging to arise and can sustain high filtration efficiency for a long period of time.

The filter of the present invention for filtration is capable of filtration at least at a rate of 50 L/m$^2$·min or higher, when the filtration is carried out at a differential pressure of 100 kPa.

Examples of the form of the filter of the present invention include a pleated form in which a filtration membrane is corrugated, a spiral form in which a filtration membrane is continuously wound, a frame and plate form in which disc-shaped filtration membranes are stacked on top of one another, and a tube form in which a filtration membrane is formed as a tube. Among these, a pleated form is particularly preferable in that the effective surface area used for filtration per cartridge can be increased.

Filter cartridges are classified into element exchange type filter cartridges in which only filter elements need to be replaced when filtration membranes having degraded are replaced, and capsule-type filter cartridges in which filter elements are provided integrally with filtration housings and both the filter elements and the housings are used in a disposable manner.

Figure 7:
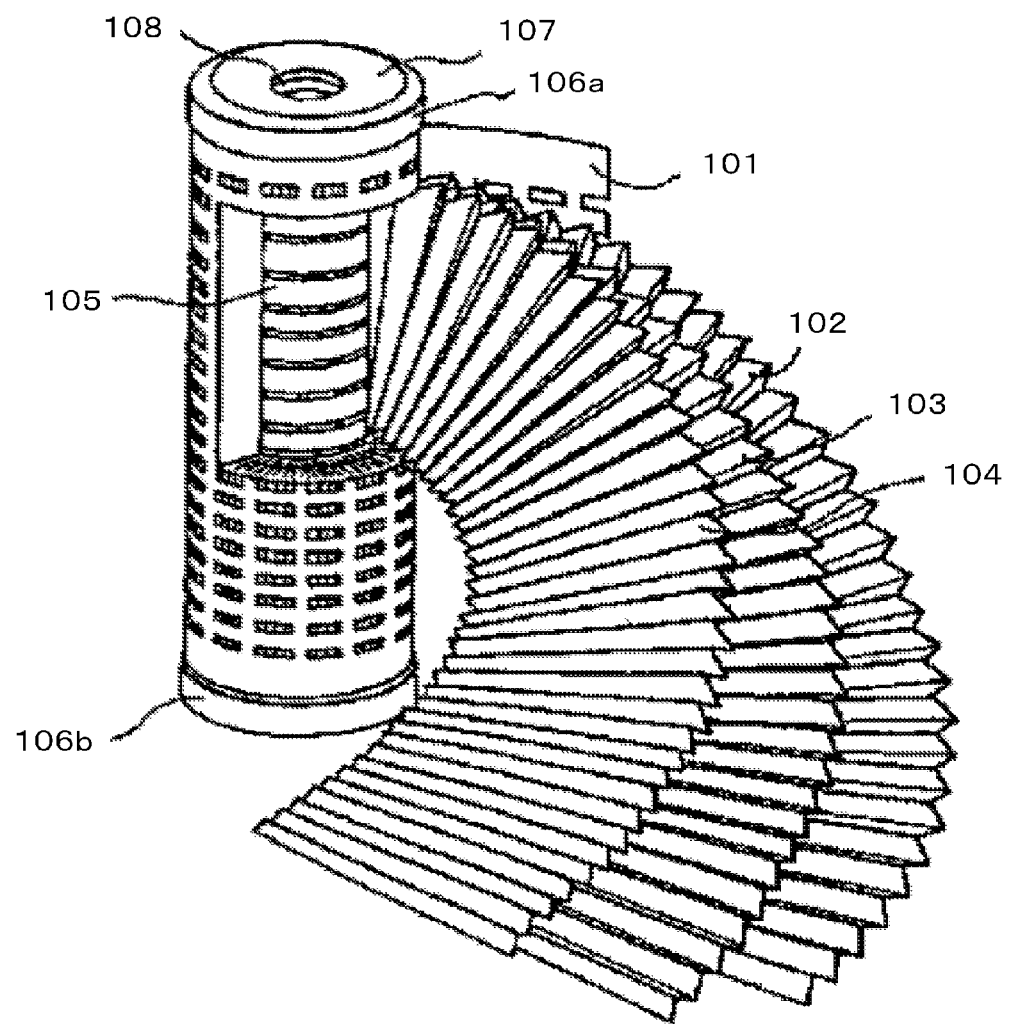
FIG. 7 is a drawing showing the structure of an ordinary pleated filter element before installed in a housing.

FIG. 7 is a developed view showing the structure of an element exchange type pleated filter cartridge element. Sandwiched between two membrane supports 102 and 104, a microfiltration membrane 103 is corrugated and wound around a core 105 having multiple liquid-collecting slots, and a cylindrical object is thus formed. An outer circumferential cover 101 is provided outside the foregoing members so as to protect the microfiltration membrane. At both ends of the cylindrical object, the microfiltration membrane is sealed with end plates 106a and 106b. The end plates are connected to a sealing portion of a filter housing (not shown), with a gasket 107 placed in between. A filtered liquid is collected through the liquid-collecting slots of the core and discharged from a fluid outlet 108.

Figure 8:
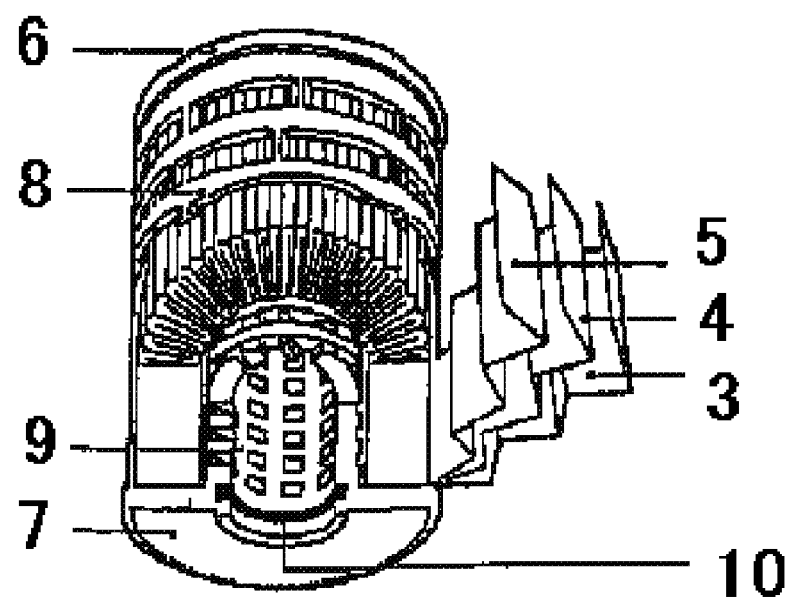
FIG. 8 is a drawing showing the structure of an ordinary filter element before installed in a housing of a capsule-type filter cartridge.
Figure 9:
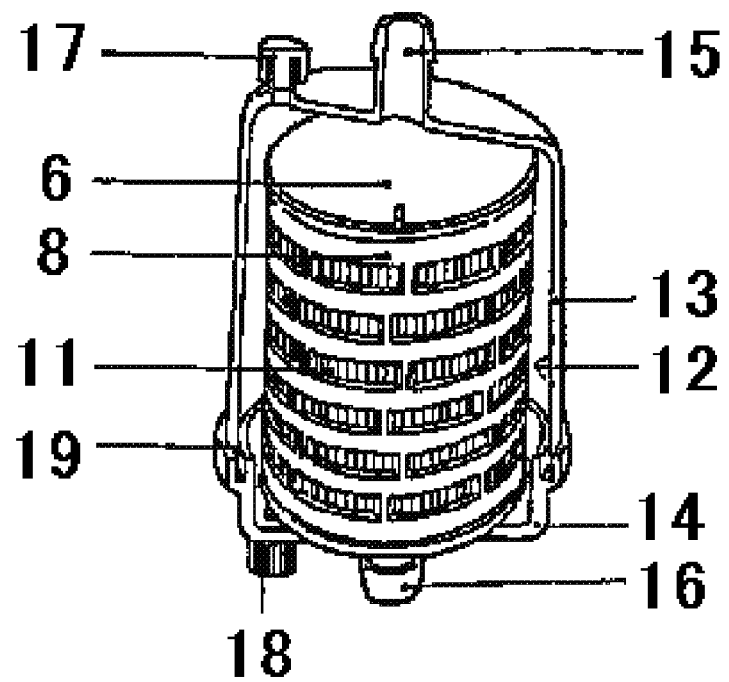
FIG. 9 is a drawing showing the structure of an ordinary capsule-type filter cartridge constructed integrally with a housing.

Capsule-type pleated filter cartridges are shown in FIGS. 8 and 9.

FIG. 8 is a developed view showing the overall structure of a microfiltration membrane filter element before installed in a housing of a capsule-type filter cartridge. Sandwiched between two supports 3 and 5, a microfiltration membrane 2 is corrugated and wound around a filter element core 9 having multiple liquid-collecting slots, and a cylindrical object is thus formed. A filter element cover 8 is provided outside the foregoing members so as to protect the microfiltration membrane. At both ends of the cylindrical object, the microfiltration membrane is sealed with an upper end plate 6 and a lower end plate 7.

FIG. 9 shows the structure of a capsule-type pleated filter cartridge in which the filter element has been installed in a housing so as to form a single unit. A filter element 12 is installed in a housing composed of a housing base and a housing cover. The lower end plate is connected in a sealed manner to a water-collecting tube (not shown) at the center of the housing base by means of an O-shaped ring 10 (see FIG. 8). A liquid enters the housing from a liquid inlet nozzle and passes through a filter medium 11, then the liquid is collected through the liquid-collecting slots of the filter element core 9 and discharged from a liquid outlet nozzle 16. In general, the housing base and the housing cover are thermally fused in a liquid-tight manner at a fusing portion 19.

FIG. 8 shows an instance where the lower end plate and the housing base are connected in a sealed manner by means of the O-shaped ring. It should be noted that the lower end plate and the housing base may be connected in a sealed manner by thermal fusing or with an adhesive. Also, the housing base and the housing cover may be connected in a sealed manner with an adhesive as well as by thermal fusing. FIGS. 7 to 9 show specific examples of microfiltration filter cartridges, and note that the present invention is not confined to the examples shown in these drawings.

Having a high filtering function and a long lifetime as described above, the filter using the crystalline polymer microporous membrane of the present invention enables a filtration device to be compact. In a conventional filtration device, multiple filtration units are used in parallel so as to offset the short filtration life; use of the filter of the present invention for filtration makes it possible to greatly reduce the number of filtration units used in parallel. Furthermore, since it is possible to greatly lengthen the period of time for which the filter can be used without replacement, it is possible to cut costs and time necessary for maintenance.

The filter of the present invention for filtration can be used in a variety of situations where filtration is required, notably in microfiltration of gases, liquids, etc. For instance, the filter can be used for filtration of corrosive gases and gases for use in the semiconductor industry, and filtration and sterilization of cleaning water for use in the electronics industry, water for medical uses, water for pharmaceutical production processes and water for foods and drinks. It should be particularly noted that since the filter of the present invention is superior in heat resistance and chemical resistance, the filter can be effectively used for high-temperature filtration and filtration of reactive chemicals, for which conventional filters cannot be suitably used.

EXAMPLES

The following explains Examples of the present invention. It should, however, be noted that the present invention is not confined to these Examples in any way.

Example 1

<Production of Polytetrafluoroethylene Microporous Membrane>
—Production of Preform—

Figure 10:
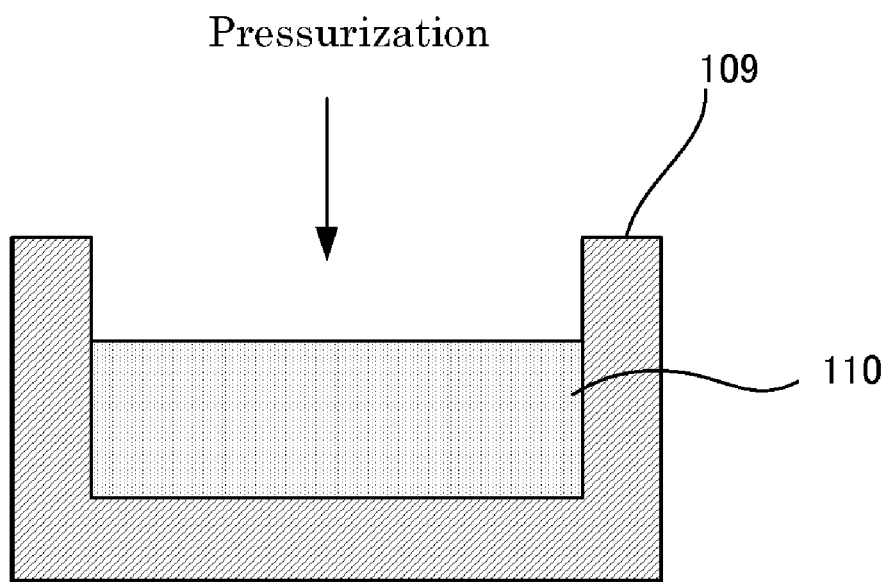
FIG. 10 is a drawing showing an example of a process of producing a crystalline polymer microporous membrane.
Figure 11:
FIG. 11 is a drawing showing an example of a preform.

To 100 parts by mass of a fine powder of polytetrafluoroethylene having a number average molecular weight of 10 million (FLUON PTFE CD123, produced by ASAHI GLASS CO., LTD.) as a crystalline polymer, 22 parts by mass of a hydrocarbon oil (ISOPAR H, produced by Esso Sekiyu K. K.) as an extrusion aid were added. The mixture was evenly placed in a mold 109 as shown in FIG. 10 and then pressurized so as to produce a preform 110 having a density of 1.33 kg/m$^3$ (see FIG. 11).

—Production of Unbaked Film—

Figure 12:
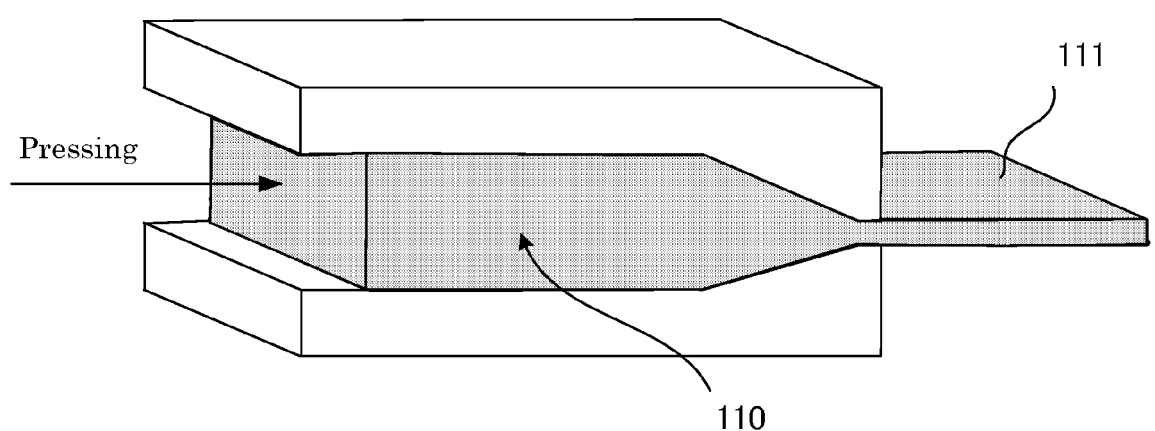
FIG. 12 is a drawing showing another example of a process of producing a crystalline polymer microporous membrane.

The produced preform 110 was inserted into a cylinder of a paste extrusion die as shown in FIG. 12 and paste-extruded into a sheet. This sheet 111 was calendered using a calender roll heated to 60° C. so as to produce a polytetrafluoroethylene film. The obtained polytetrafluoroethylene film was dried in a hot-air drying oven set at 250° C. so as to remove the extrusion aid, and a polytetrafluoroethylene unbaked film having an average thickness of 150 μm, an average width of 150 mm and a density of 1.55 kg/m$^3$ was thus produced.

—Production of Semi-Baked Film (Roll Heating)—

The obtained polytetrafluoroethylene unbaked film was heated for one minute using a steel roll heated to 345° C. (the dielectric heat-generating metal roll incorporated in the dielectric heat-generating high-temperature and high-speed calendering apparatus installed in URI ROLL CO., LTD. (manufactured by YURI ROLL CO., LTD.)) so as to produce a semi-baked film. When the widthwise temperature distribution in a steady state of the roll used at that time (a state in which when the temperature was measured at 0.1-second intervals, the temperature varied within 1° C. in 10 seconds) was measured using infrared thermography, it was found that the temperature difference between a site having the maximum temperature and a site having the minimum temperature was 1.0° C.

—Production of Polytetrafluoroethylene Microporous Membrane—

Figure 2A:
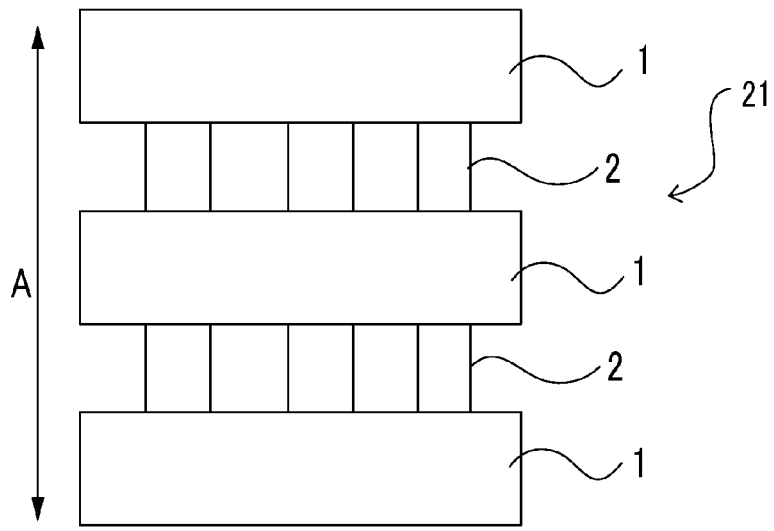
FIG. 2A is a drawing showing a primary stretching step.
Figure 2B:
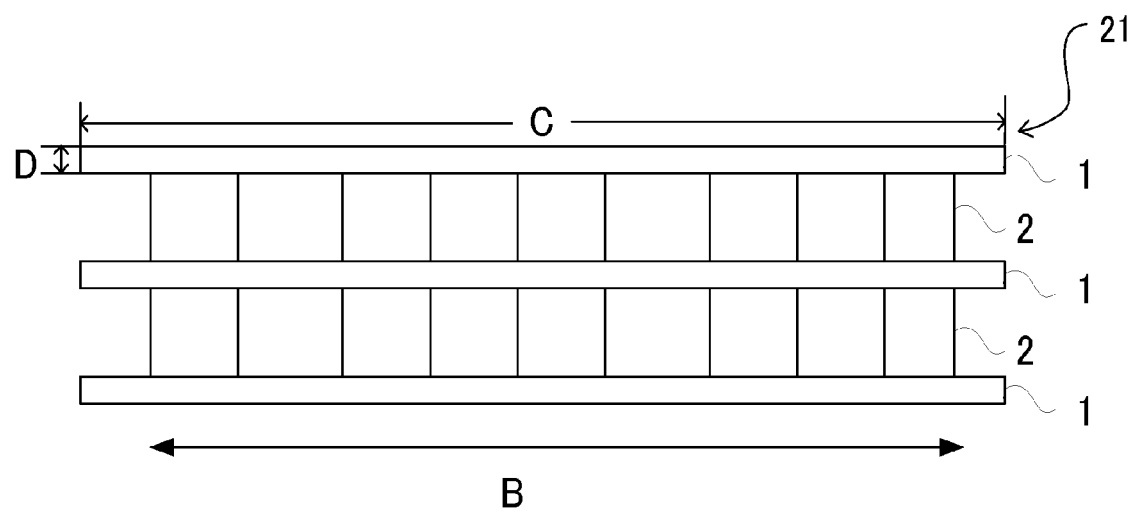
FIG. 2B is a drawing showing a secondary stretching step carried out after sintering.
Figure 5A:
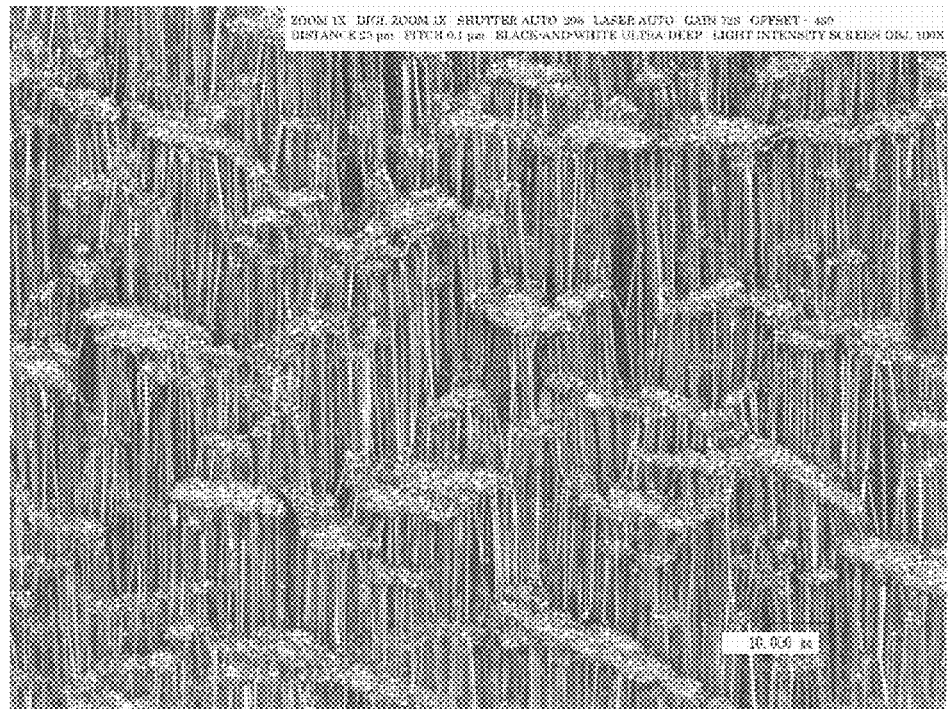
FIG. 5A is a laser microscope photograph showing an unheated surface of a film after a primary stretching step in Example 1.
Figure 5B:
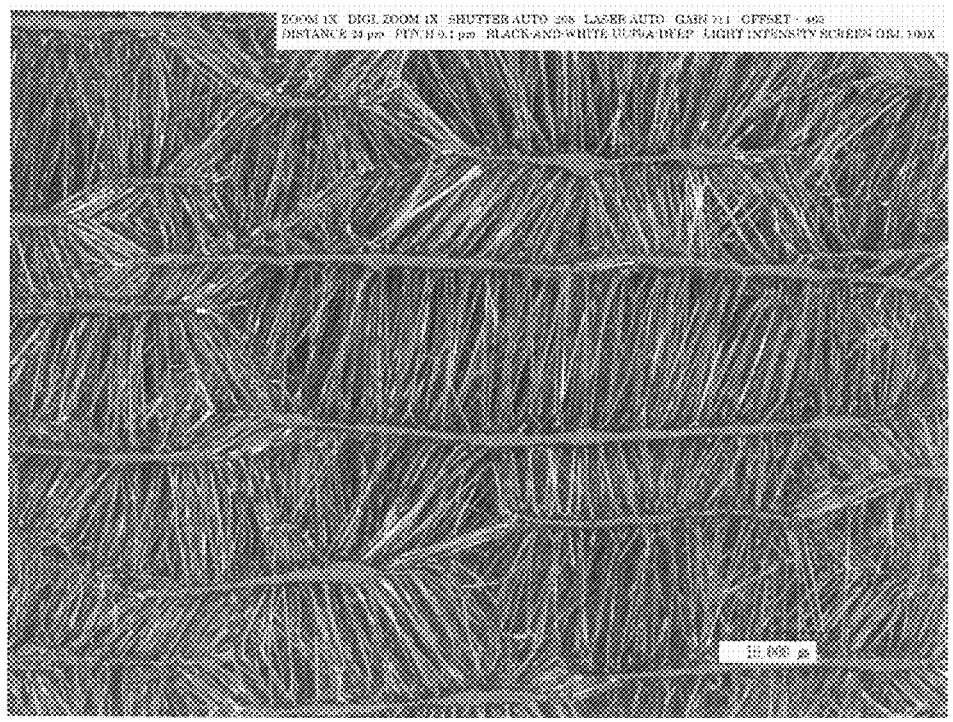
FIG. 5B is a laser microscope photograph showing an unheated surface of a crystalline polymer microporous membrane obtained in Example 1.
Figure 6:
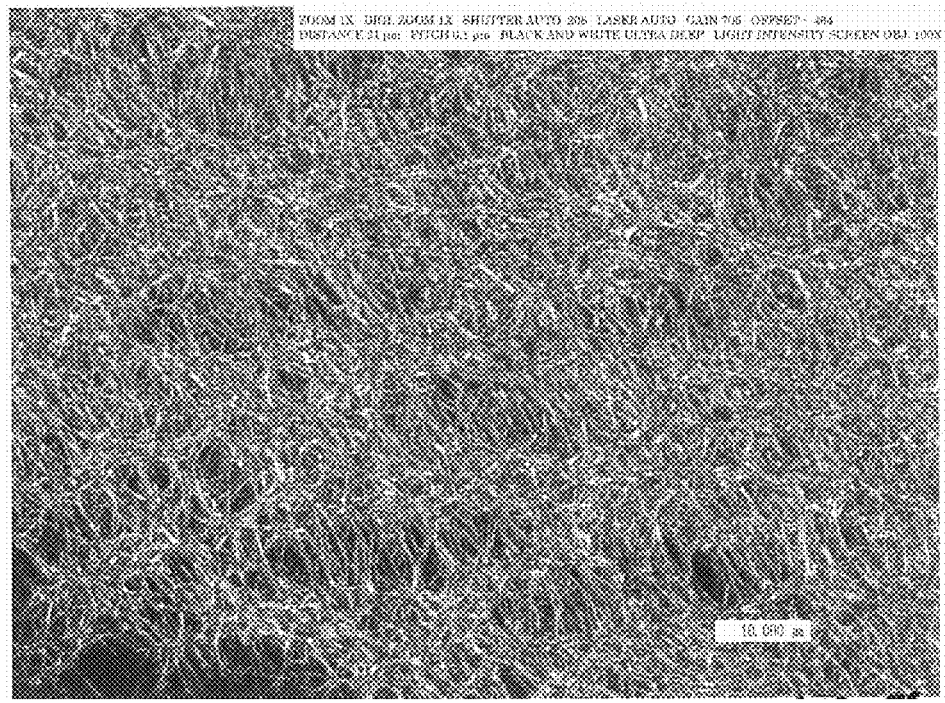
FIG. 6 is a laser microscope photograph showing a heated surface of the crystalline polymer microporous membrane obtained in Example 1.

The obtained semi-baked film 21 was stretched in lengthwise directions (the directions of the arrow A in FIG. 2A) between rolls at 270° C. such that the length of the film increased 13-fold lengthwise (primary stretching step), then the film was temporarily wound around a take-up roll. Thereafter, the film was heated for one minute using a steel roll heated to 345° C. FIG. 2A is a schematic drawing showing the primary stretching step. FIG. 5A is a laser microscope photograph (taken using the laser microscope VK8700, manufactured by KEYENCE CORPORATION) showing an unheated surface of the film after the primary stretching step. Afterward, the film was heated for one minute at 380° C. utilizing a heating zone produced by a duct heater (sintering step). Thereafter, both ends of the film were pinched with clips, and the film was stretched in width directions (the directions of the arrow B in FIG. 2B) at 375° C. such that the length of the film increased fivefold widthwise (secondary stretching step). FIG. 2B is a schematic drawing showing the secondary stretching step. Afterward, heat fixation was carried out at 380° C. A polytetrafluoroethylene microporous membrane of Example 1 was thus produced. Note that in FIGS. 2A and 2B, the numeral 1 denotes a nodule and the numeral 2 denotes a fibril. FIG. 5B is a laser microscope photograph showing an unheated surface of the film. FIG. 6 is a laser microscope photograph showing a heated surface of the film. FIG. 5B revealed that new fibrillation had not occurred, nodules had extended and the aspect ratio had increased.

Laser microscope photographs of cross sections of the obtained microporous membrane revealed that a microstructure occupied 70% of the membrane relative to the total thickness of the membrane, spreading from one surface (unheated surface) in a thickness direction.

Example 2

<Production of Polytetrafluoroethylene Microporous Membrane>

A polytetrafluoroethylene unbaked film was produced as in Example 1.

—Production of Semi-Baked Film (Infrared Heating)—

One surface of the obtained polytetrafluoroethylene unbaked film was heated for one minute at a film surface temperature of 345° C., utilizing a near-infrared ray emitted by a halogen heater incorporating a tungsten filament, so as to produce a semi-baked film.

—Production of Polytetrafluoroethylene Microporous Membrane—

The obtained semi-baked film 21 was stretched in lengthwise directions (the directions of the arrow A in FIG. 2A) between rolls at 270° C. such that the length of the film increased 13-fold lengthwise (primary stretching step), then the film was temporarily wound around a take-up roll. Thereafter, the film was heated for one minute at 345° C. Afterward, the film was heated for one minute at 380° C. using a halogen heater (sintering step), then both ends of the film were pinched with clips, and the film was stretched in width directions (the directions of the arrow B in FIG. 2B) at 375° C. such that the length of the film increased fivefold widthwise (secondary stretching step). Afterward, heat fixation was carried out at 380° C. A polytetrafluoroethylene microporous membrane of Example 2 was thus produced.

Laser microscope photographs of cross sections of the obtained microporous membrane revealed that a microstructure occupied 70% of the membrane relative to the total thickness of the membrane, spreading from one surface (unheated surface) in a thickness direction.

Comparative Example 1

<Production of Polytetrafluoroethylene Microporous Membrane>

A polytetrafluoroethylene unbaked film was produced as in Example 1.

—Production of Semi-Baked Film (Infrared Heating)—

One surface of the obtained polytetrafluoroethylene unbaked film was heated for one minute at a film surface temperature of 345° C., utilizing a near-infrared ray emitted by a halogen heater incorporating a tungsten filament, so as to produce a semi-baked film.

—Production of Polytetrafluoroethylene Microporous Membrane—

Figure 1B:
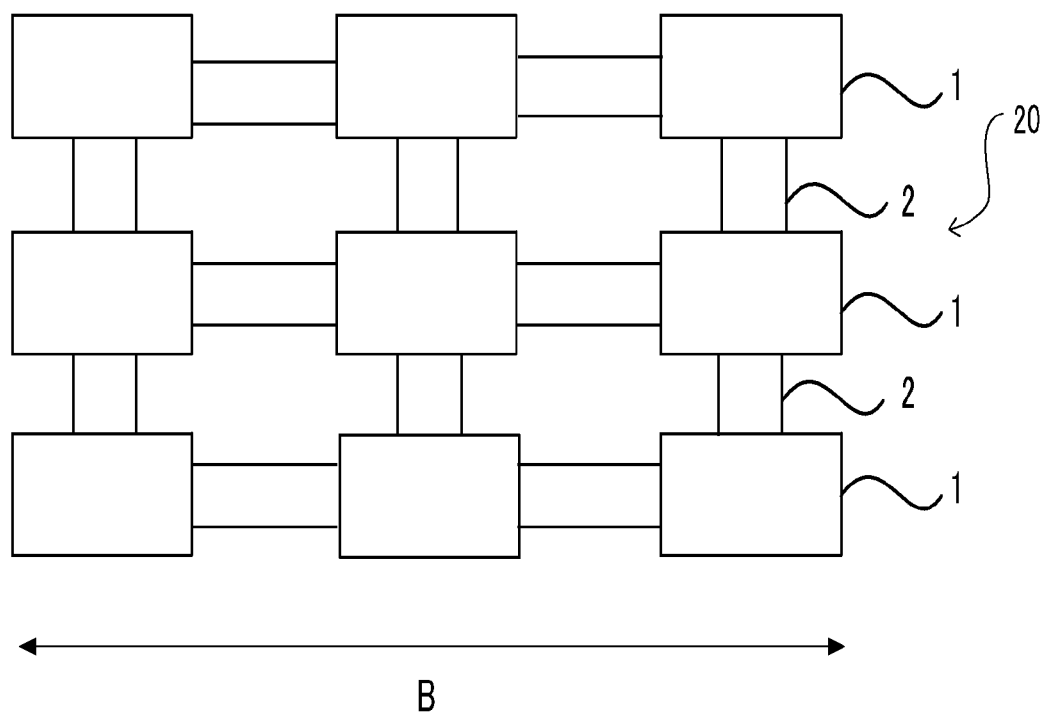
FIG. 1B is a drawing showing a secondary stretching step.
Figure 3A:
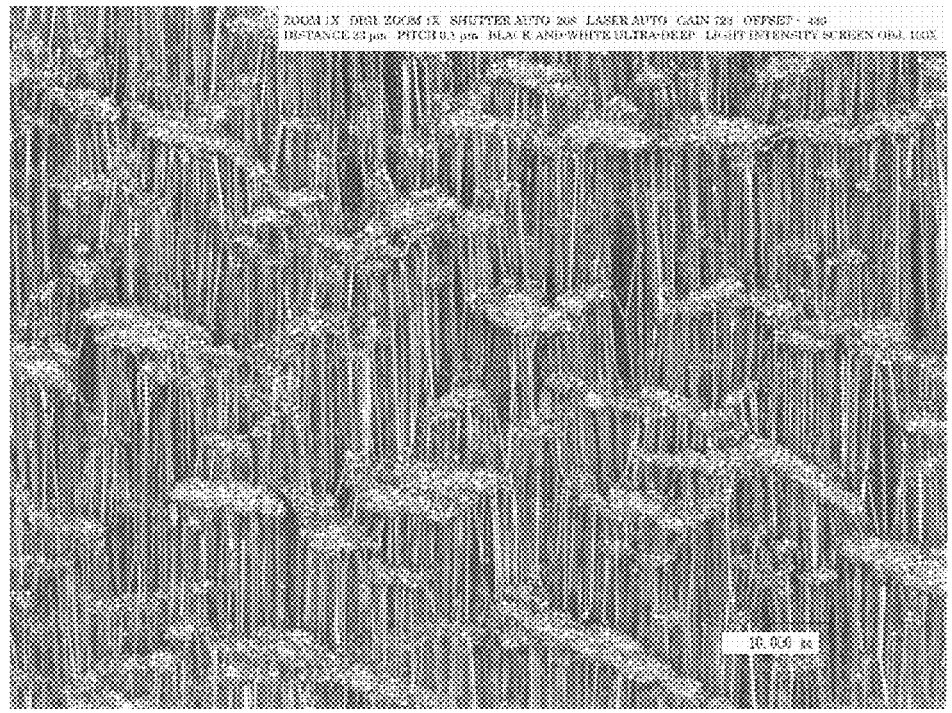
FIG. 3A is a laser microscope photograph showing an unheated surface of a film after a primary stretching step in Comparative Example 1.
Figure 3B:
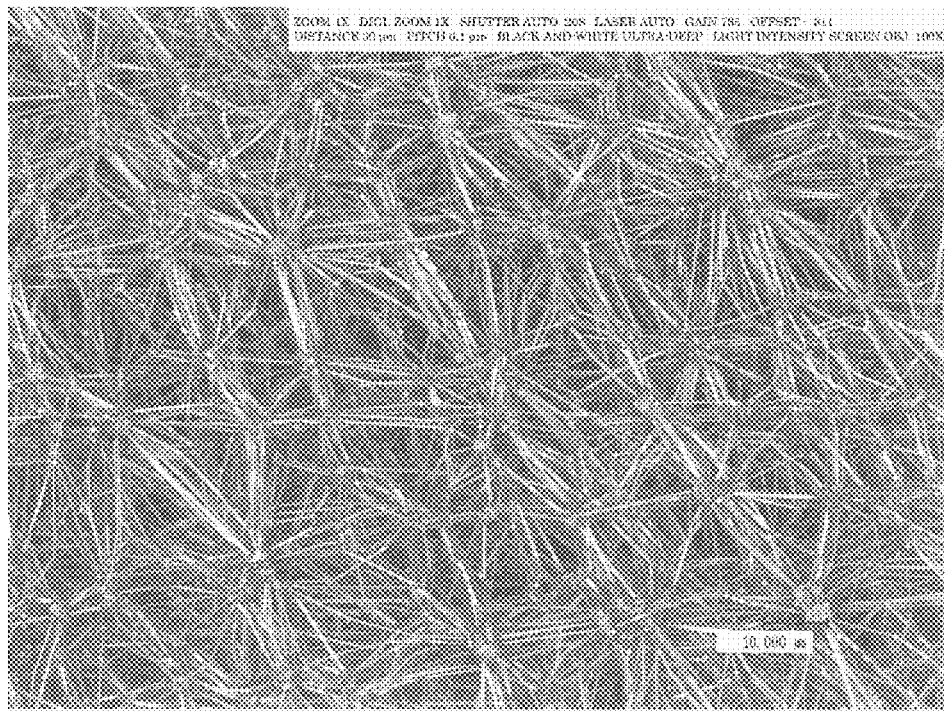
FIG. 3B is a laser microscope photograph showing an unheated surface of a crystalline polymer microporous membrane obtained in Comparative Example 1.
Figure 4:
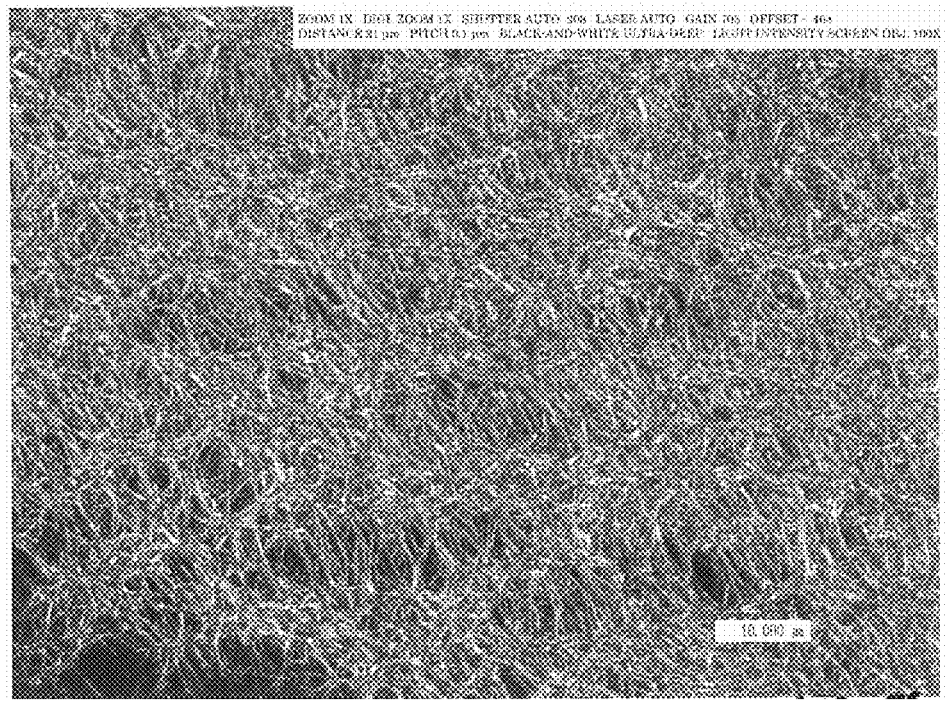
FIG. 4 is a laser microscope photograph showing a heated surface of the crystalline polymer microporous membrane obtained in Comparative Example 1.

The obtained semi-baked film 20 was stretched in lengthwise directions (the directions of the arrow A in FIG. 1A) between rolls at 270° C. such that the length of the film increased 13-fold lengthwise (primary stretching step), then the film was temporarily wound around a take-up roll. Thereafter, the film was heated for one minute at 304° C. FIG. 1A is a schematic drawing showing the primary stretching step. FIG. 3A is a laser microscope photograph showing an unheated surface of the film after the primary stretching step. Subsequently, both ends of the film were pinched with clips, and the film was stretched in width directions (the directions of the arrow B in FIG. 1B) at 270° C. such that the length of the film increased fivefold widthwise (secondary stretching step). FIG. 1B is a schematic drawing showing the secondary stretching step. Afterward, heat fixation was carried out at 380° C. A polytetrafluoroethylene microporous membrane of Comparative Example 1 was thus produced. Note that in FIGS. 1A and 1B, the numeral 1 denotes a nodule and the numeral 2 denotes a fibril. FIG. 3B is a laser microscope photograph showing an unheated surface of the film. FIG. 4 is a laser microscope photograph showing a heated surface of the film. FIG. 3B revealed that new fibrillation had occurred, and the aspect ratio had decreased.

Laser microscope photographs of cross sections of the obtained microporous membrane revealed that a microstructure occupied 0% of the membrane relative to the total thickness of the membrane.

Comparative Example 2

<Production of Polytetrafluoroethylene Microporous Membrane>

A polytetrafluoroethylene microporous membrane of Comparative Example 2 was produced in the same manner as in Example 1, except that the unbaked film was not semi-baked (asymmetrically heated).

Laser microscope photographs of cross sections of the obtained microporous membrane revealed that a microstructure occupied 100% of the membrane relative to the total thickness of the membrane, spreading from one surface (unheated surface) in a thickness direction.

Comparative Example 3

<Production of Polytetrafluoroethylene Microporous Membrane>

A polytetrafluoroethylene microporous membrane of Comparative Example 3 was produced in the same manner as in Example 1, except that the sintering step was not carried out between the primary stretching step and the secondary stretching step.

Laser microscope photographs of cross sections of the obtained microporous membrane revealed that a microstructure occupied 0% of the membrane relative to the total thickness of the membrane.

Next, the aspect ratios of nodules and the area ratios of fibrils to nodules (fibrils/nodules) regarding the polytetrafluoroethylene microporous membranes of Examples 1 and 2 and Comparative Examples 1 to 3 were calculated as described below. The results are shown in Table 1.

<Aspect Ratio of Nodule>

Nodules of the polytetrafluoroethylene microporous membrane of each of Examples 1 and 2 and Comparative Examples 1 to 3 were measured for their lengths and widths in the following manner, using a laser microscope (the laser microscope VK8700, manufactured by KEYENCE CORPORATION): the ratio (lengths/widths) of nodules was measured in arbitrarily selected five views, and the average value thereof was defined as the aspect ratio. The results are shown in Table 1.

<Area Ratio of Fibrils to Nodules (Fibrils/Nodules)>

Fibrils and nodules of the polytetrafluoroethylene microporous membranes of Examples 1 and 2 and Comparative Examples 1 to 3 were photographed (SEM photographs with a magnification of 1,000 to 5,000) using a scanning electron microscope (HITACHI S-4000 or HITACHI E1030, manufactured by Hitachi, Ltd.). Each photograph was taken into an image processing apparatus (Name of main body: TV IMAGE PROCESSOR TVIP-410011, manufactured by Nippon Avionics Co., Ltd., Name of control software: TV IMAGE PROCESSOR IMAGE COMMAND 4198, manufactured by Ratoc System Engineering Co., Ltd.) so as to separate the fibrils and the nodules from each other and obtain an image only including the fibrils and an image only including the nodules. Next, the maximum nodule area was calculated by arithmetically processing the image only including the nodules, and the average diameter of the fibrils was calculated by arithmetically processing the image only including the fibrils (calculated by dividing the total area by ½ of the total circumferential length). The area ratio of the fibrils to the nodules was calculated from the ratio of the aggregate area of the fibril image to the aggregate area of the nodule image. The results are shown in Table 1.

Subsequently, each of the produced polytetrafluoroethylene microporous membranes of Examples 1 and 2 and Comparative Examples 1 to 3 was measured for its thickness and the ratio P1/P2 as described below in order to confirm whether or not the average pore diameter at the unheated front surface of the microporous membrane was larger than the average pore diameter at the heated back surface of the microporous membrane, and whether or not the average pore diameter continuously changed from the front surface toward the back surface. The results are shown in Table 1.

<Film Thickness (Membrane Thickness)>

Each of the polytetrafluoroethylene microporous membranes of Examples 1 and 2 and Comparative Examples 1 to 3 was measured for its thickness using a 0.001 mm dial thickness gauge (SM1201, manufactured by TECLOCK Corporation). The thickness was measured in arbitrarily selected five places, and the average value thereof was defined as the membrane thickness.

<Measurement of P1/P2>

Regarding each of the polytetrafluoroethylene microporous membranes of Examples 1 and 2 and Comparative Examples 1 to 3, when the membrane was assumed to have a thickness of 10, the average pore diameter at a portion located at a depth of 1 from the front surface of the membrane was denoted by P1, and the average pore diameter at a portion located at a depth of 9 from the front surface of the membrane was denoted by P2, P1/P2 was calculated.

Here, the average pore diameter of the microporous membrane was measured in the following manner: the front surface of the membrane was photographed (SEM photograph with a magnification of 1,000 to 5,000) using a scanning electron microscope (HITACHI S-4000, and HITACHI E1030 (for vapor deposition), both manufactured by Hitachi, Ltd.), the photograph was taken into an image processing apparatus (Name of main body: TV IMAGE PROCESSOR TVIP-4100II, manufactured by Nippon Avionics Co., Ltd., Name of control software: TV IMAGE PROCESSOR IMAGE COMMAND 4198, manufactured by Ratoc System Engineering Co., Ltd.) so as to obtain an image only including polytetrafluoroethylene fibers, and the average pore diameter was calculated by arithmetically processing the image.

TABLE 1

| | Aspect ratio of nodules | Membrane thickness (μm) | P1/P2 | Area ratio of fibrils to nodules (fibrils/nodules) |
|---|---|---|---|---|
| Example 1 | 30 | 30 | 5 | 85/15 |
| Example 2 | 30 | 25 | 7 | 80/20 |
| Comparative Example 1 | 1 | 70 | 5 | 80/20 |
| Comparative Example 2 | 30 | 30 | 1 | 85/15 |
| Comparative Example 3 | 1 | 70 | 5 | 85/15 |

<Filtration Life Test>

For the measurement of the filtration life, a latex dispersion liquid was used, and the filtration life was evaluated in terms of the filtration amount (L/m$^2$) measured until substantial clogging occurred. In the present invention, the expression "substantial clogging" means a point in time when the flow rate has decreased to ½ of the initial flow rate. The type of latex used for the latex dispersion liquid was suitably selected according to the pore diameter of the membrane. As for conditions of the selection, the quantity of particles contained in the filtered liquid was 1 ppm or less, and the ratio of the average particle diameter of the latex to the pore diameter of the membrane was in the range of ⅕ to 5. Isopropanol was used as a dispersion medium, and the concentration was 100 ppm. The results are shown in Table 2.

TABLE 2

| | Filtration life test |
|---|---|
| Example 1 | 500 L/m$^2$ |
| Example 2 | 500 L/m$^2$ |
| Comparative Example 1 | 500 L/m$^2$ |
| Comparative Example 2 | 100 L/m$^2$ |
| Comparative Example 3 | 500 L/m$^2$ |

<Flow Rate Test>

The flow rate was measured under the following conditions in accordance with JIS (Japanese Industrial Standards) K3831. A pressure filtration testing method was employed as the testing method, a sample was cut into a circle having a diameter of 13 mm and set on a holder made of stainless steel, and the measurement was thus carried out. Isopropanol was used as a test liquid, and the flow rate (L/min·m$^2$) was calculated by measuring the time required to filter 100 mL of the test liquid under a pressure of 100 kPa. The results are shown in Table 3.

TABLE 3

| | Flow rate test |
|---|---|
| Example 1 | 1,500 L/min · m$^2$ |
| Example 2 | 1,700 L/min · m$^2$ |
| Comparative Example 1 | 500 L/min · m$^2$ |
| Comparative Example 2 | 1,500 L/min · m$^2$ |
| Comparative Example 3 | 500 L/min · m$^2$ |

Example 3

—Production of Filter Cartridge—

Used in the following structure, the PTFE microporous membrane of Example 1 was pleated so as to have a corrugation width of 12.5 mm (pleat width of 220 mm), provided with 230 folds and formed into a cylindrical shape, and the joint was fused using an impulse sealer so as to form a cylindrical object. Both ends of the cylindrical object were cut by 15 mm each, and the cut surfaces were thermally fused with a polypropylene end plate so as to constitute an element exchange type filter cartridge.

—Structure—

Primary side: Net DELNET (RC-0707-20P) manufactured by AET. Inc.
   thickness: 0.13 mm, basis weight: 31 g/m$^2$, area used: approx. 1.3 m$^2$
Primary side: Unwoven fabric SYNTEX (PK-404N) manufactured by Mitsui Chemicals, Inc.
   thickness: 0.15 mm, area used: approx. 1.3 m$^2$ Filter material: PTFE microporous membrane of Example 1
thickness: 0.05 mm, area used: approx. 1.3 m²
Secondary side: Net DELNET (RC-0707-20P) manufactured by AET. Inc.
thickness: 0.13 mm, basis weight: 31 g/m², area used: approx. 1.3 m²

Since the filter cartridge of Example 3 in the present invention used the crystalline polymer microporous membrane of Example 1, the filter cartridge was superior in solvent resistance. Also, since pores in the crystalline polymer microporous membrane were asymmetrically formed, the flow rate was high, clogging hardly arose and a long lifetime was yielded.

The present invention's crystalline polymer microporous membrane and filter for filtration using the crystalline polymer microporous membrane are capable of efficiently trapping fine particles for a long period of time, which improves abrasion resistance in particle trapping ability, and superior in heat resistance and chemical resistance, so that they can be used in a variety of situations where filtration is required, notably in microfiltration of gases, liquids, etc. For instance, the crystalline polymer microporous membrane and the filter for filtration can be widely used for filtration of corrosive gases and gases for use in the semiconductor industry, filtration and sterilization of cleaning water for use in the electronics industry, water for medical uses, water for pharmaceutical production processes and water for foods and drinks, high-temperature filtration and filtration of reactive chemicals.

What is claimed is:

1. A crystalline polymer microporous membrane comprising:
    a microstructure on the side of one surface of the membrane, the microstructure being composed of series of nodules interconnected with one another by fibrils,
    wherein the average pore diameter at the one surface of the membrane is larger than the average pore diameter at another surface of the membrane, and the average pore diameter continuously changes from the one surface toward the other surface,
    wherein the nodules have an aspect ratio (length/width) of 25 or greater, and
    wherein the crystalline polymer microporous membrane is a single-layer structure.

2. The crystalline polymer microporous membrane according to claim 1, wherein the microstructure occupies 90% or less of the membrane relative to the total thickness of the membrane, spreading from the one surface in a thickness direction.

3. The crystalline polymer microporous membrane according to claim 1, having a thickness of 50 μm or less.

4. The crystalline polymer microporous membrane according to claim 1, being made of polytetrafluoroethylene.

5. A method for producing a crystalline polymer microporous membrane, comprising:
    performing asymmetrical heating in which one surface of an unstretched film made of a crystalline polymer is heated at a temperature which is equal to or higher than the melting point of the heated crystalline polymer and which is equal to or lower than the sum of the melting point of the unheated crystalline polymer and 15° C. so as to form a semi-baked film having a temperature gradient with respect to a thickness direction of the film,
    primarily stretching the semi-baked film in a uniaxial direction,
    sintering the primarily stretched film by heating the film at an equal or higher temperature than in the asymmetrical heating, and
    secondarily stretching the sintered film in a direction perpendicular to the uniaxial direction.

6. The method according to claim 5, wherein the film is heated at 350° C. or higher in the sintering.

7. The method according to claim 5, wherein in the asymmetrical heating, the crystalline polymer film is heated by being irradiated with an electromagnetic wave.

8. The method according to claim 7, wherein the electromagnetic wave is an infrared ray.

9. The method according to claim 5, wherein the crystalline polymer is polytetrafluoroethylene.

10. A filter for filtration, comprising:
    a crystalline polymer microporous membrane which comprises a microstructure on the side of one surface of the membrane, the microstructure being composed of series of nodules interconnected with one another by fibrils,
    wherein the average pore diameter at the one surface of the membrane is larger than the average pore diameter at another surface of the membrane, and the average pore diameter continuously changes from the one surface toward the other surface, and
    wherein the nodules have an aspect ratio (length/width) of 25 or greater.

11. The crystalline polymer microporous membrane according to claim 1, wherein the another surface comprises a dense layer which comprises a baked crystalline polymer.

* * * * *